United States Patent Office 3,501,578
Patented Mar. 17, 1970

---

3,501,578
FUNGICIDAL COMPOSITION CONTAINING PHENYL - MERCAPTOMETHANE-SULFONAMIDE AND METHOD OF USING THE SAME
Hans Helmuth Schlor, Wuppertal-Barmen, and Ferdinand Grewe, Burscheid, Germany, assignors to Farbenfabriken Bayer Aktiengesellschaft, Leverkusen, Germany, a corporation of Germany
No Drawing. Original application Mar. 11, 1966, Ser. No. 533,449, now Patent No. 3,412,149, dated May 3, 1968. Divided and this application Feb. 27, 1968, Ser. No. 708,500
Claims priority, application Germany, Mar. 12, 1965, F 45,504
Int. Cl. A01n 9/16; C07c 149/44
U.S. Cl. 424—321                    5 Claims

---

ABSTRACT OF THE DISCLOSURE

Phenyl-mercaptomethane-sulfonamide composition and method which possesses fungicidal properties.

---

This case is a division of co-pending parent application Ser. No. 533,449, filed Mar. 11, 1966, now U.S. Patent No. 3,412,149.

The present invention relates to phenyl-mercaptomethane-sulfonamide, which has fungitoxic properties, to compositions thereof with dispersible carrier vehicles, as well as to the preparation and use thereof.

It is already known that zinc propylene-bis-dithiocarbamate (A), zinc ethylene-bis-dithio-carbamate (B) and N-(trichloromethyl-thio)-tetrahydro-phthalimide (C) can be used with good results for combating parasitic fungi on parts of plants above ground, such as species of phytophthora, peronospora and venturia.

It is an object of the present invention to provide the particular new compound phenyl-mercaptomethane-sulfonamide, which possesses valuable fungitoxic properties; to provide active compositions thereof in the form of mixtures with solid and liquid dispersible carrier vehicles; to provide a process for producing such compound, and to provide methods of using such compound in a new way, especially for combating fungi and, in particular, parasitic fungi.

Other and further objects of the present invention will become apparent from a study of the within specification and accompanying examples.

It has now been found that the particular new compound phenyl-mercaptomethane-sulfonamide, which has the formula:

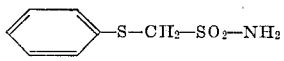      (I)

has strong fungitoxic properties.

It has been further found that such new compound phenyl-mercaptomethane-sulfonamide is obtained by the process which comprises reacting thiophenol, in the presence of an acid-binding agent, with a halomethane-sulfonamide of the general formula:

$$\text{Hal—CH}_2\text{—SO}_2\text{NH}_2 \quad \quad \text{(IIa)}$$

in which Hal represents a halogen atom, preferably a chlorine, bromine or iodine atom.

It is very surprising that the active compound according to the present invention has markedly stronger fungitoxic properties than the fungicidal agents known for the same purpose and that the instant compound also has curative and systemic effects.

The course of the reaction for producing the instant compound according to the present invention can be illustrated by the following equation:

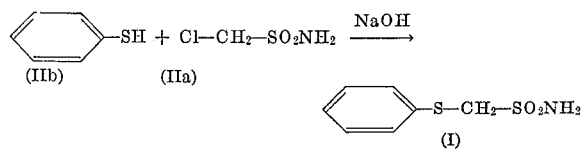

The two starting materials required for the above reaction are known. Such reaction is preferably carried out in the presence of water. However, it is also possible to use aqueous solutions of water-soluble organic solvents, such as alcohols, ketones and dimethyl formamide.

All conventional acid-binding agents can be used as acid binders herein, especially those which are water-soluble. Alkali metal hydroxides, such as potassium hydroxide and sodium hydroxide, and alkali metal carbonates, such as potassium carbonate and sodium carbonate, are particularly suitable.

The reaction temperatures for the production process herein may be varied within a fairly wide range. In general, the operation is carried out substantially between about 50 and 120° C., preferably between 60 and 100° C. The boiling temperature of the aqueous reaction mixture is especially suitable when working at atmospheric pressure.

To carry out the instant process, the starting materials and the acid-binding agent are expediently used in a molar ratio of 1:1:1. It is possible to go above or remain below these proportions by a deviation of up to about 20%, without substantially reducing the yield.

The instant reaction is carried out in the usual manner. For example, the thiophenol can be mixed first with an aqueous solution of the acid-binding agent and the chloromethane-sulfonamide subsequently introduced into this mixture. The reaction mixture is expediently heated at boiling temperature for some time. The final product crystallize out upon cooling.

Phenyl-mercaptomethane-sulfonamide has a strong fungicidal activity. Due to its advantageously low toxicity towards warm-blooded creatures, it is suitable for combating undesirable plant growth. The good compatibility of the instant compound with higher plants enables such compound to be used effectively as plant protective agent against fungus plant diseases, especially in crop control endeavors, without damage to the desired higher plants.

The instant compound has a particularly good, i.e. effective, fungicidal activity against parasitic fungi on plant parts above ground, such as species of Phytophthora, Peronospora and Venturia.

It must be especially emphasized that the instant active compound has not only a protective action but also a curative effect, i.e., the fungicidal action is evident even when applied after contamination with the spores of the fungus. Attention should also be drawn to the systemic action of the instant compound.

Thus, it is possible in accordance with the present invention to protect plants against infestation with fungi by supplying the plant parts above ground with the instant active compound via the soil and the roots, i.e., systemically. The protective (preventive), as well as curative and systemic activity of the instant compound against fungi, of course, may be achieved without causing any damage to higher plants, whereby the instant compound may be used without restriction in crop control pursuits.

Thus, the new compound of the instant invention can be used as a fungicide, especially for combating parasitic fungi, either alone or in admixture with solid or liquid carriers or diluents.

The active compound according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agent with dispersible liquid diluent carriers and/or dispersible solid carriers optionally with the use of carrier vehicle assistants including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.), ketones (for instance, acetone, etc.), and water; as well as dispersible finely divided solid carriers, such as natural ground minerals (for instance, kaolins, alumina, silica, chalk, i.e., calcium carbonate, talc, kieselguhr, etc.) and synthetic ground minerals (for instance, highly dispersed silicic acid, silicates, e.g., alkali silicates, etc.); whereas the following may be chiefly considered for use as carrier vehicle assistants for this purpose: emulsifying agents, such as nonionic and anionic emulsifying agents (for instance, polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

As will be appreciated by the artisan, the active compound according to the instant invention may be present in such formulations or compositions in the form of mixtures with one or more carrier vehicles together and with other known active substances, if desired.

The substance according to the invention may be employed, therefore, by itself as the artisan will appreciate, in the form of its compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.0001 and 5%, preferably 0.001 and 1%, by weight of the mixture. Thus, the present invention contemplates over-all compositions which comprise mixtures of a dispersible carrier vehicle such as a dispersible carrier solid, or a dispersible carrier liquid preferably including a carrier vehicle assistant such as an emulsifying agent and/or a dispersing agent and an amount of the active compound which is effective for the purpose in question and which is generally between about 0.0001 and 95% by weight of the mixture. Specifically, the active compound may be applied to a given area of soil, for instance, in concentrations substantially between about 0.1 and 5 kg. per hectare. It will be realized that the concentration of the active compound in question may vary within a fairly wide range and will depend upon the fungus diseases against which the plants are to be protected, yet the foregoing ranges are typical for the usual case.

Furthermore, the present invention contemplates methods of selectively controlling or combating fungi, e.g., parasitic fungi, which comprise applying to at least one of (a) such fungi and (b) their habitat, a fungicidally effective amount of the active compound of the invention alone or together with a carrier vehicle as noted above. The instant formulations or compositions are applied in the usual manner, for example by spraying, atomizing, scattering, dusting, watering, sprinkling, and the like.

The following examples are given for the purpose of illustrating, while not limiting, the utility of the compound according to the present invention:

EXAMPLE 1

Phytophthora test:
Solvent—4.7 parts by weight acetone
Dispersing agent—0.3 part by weight alkylarly polyglycol ether
Water—95 parts by weight The amount of the particular active compound required for the desired concentration of such active compound in a spray liquor is mixed with the stated amount of solvent and the resulting concentrate then diluted with the stated amount of water containing the dispersing agent.

Young tomato plants (Bonny best) with 2–6 foliage leaves are sprayed with the subject spray liquor until dripping wet. The plants are kept in a greenhouse for 24 hours at 20° C. and at a relative atmospheric humidity of 70%. The tomato plants are then inoculated with an aqueous spore suspension of Phytophthora infestans. The plants are transferred to a moist chamber with an atmospheric humidity of 100% and a temperature of 18–20° C.

After 5 days, the infestation of the tomato plants is determined as a percentage of the untreated, but also inoculated, control plants. 0% indicates that no infestation occurred, whereas 100% indicates that the infestation is exactly the same as that of the control plants.

The active compounds, their concentrations and the results obtained can be seen from the following Table 1:

TABLE 1.—PHYTOPHTHORA TEST

| Active Compound | Infestation in percent of infestation of untreated control at a concentration of active compound of— | | |
|---|---|---|---|
| | 0.025% | 0.00625% | 0.003125% |
| (B) $CH_2-NH-C(=S)-S$ \ $Zn$ / $CH_2-NH-C(=S)-S$ (known) | 4 | 33 | 61 |
| (I) $C_6H_5-S-CH_2-SO_2-NH_2$ | 0 | 8 | 22 |

EXAMPLE 2

Plasmopara test:
Solvent—4.7 parts by weight acetone
Dispersing agent—0.3 part by weight alkylaryl polyglycol ether
Water—95 parts by weight The amount of the particular active compound required for the desired final concentration of such active compound in a spray liquid is mixed with the stated amount of solvent and the resulting concentrate then diluted with the stated amount of water containing the dispersing agent.

Young potted vines (variety Müller-Thurgau) with 2–6 foliage leaves are sprayed with the subject spray liquid until dripping wet. The plants are kept in a greenhouse for 24 hours at 20° C. and at a relative atmospheric humidity of 70%. The vines are subsequently inoculated with an aqueous spore suspension of *Plasmopara viticola*. The plants are transferred into a moist chamber with an atmospheric humidity of 100% and a temperature of 20–22° C.

After 5 days, the infestation of the vines is determined as a percentage of the untreated but also inoculated control plants. 0% indicates that no infestation occurs whereas 100% indicates that the infestation is exactly the same as that of the control plants.

The active compounds, their concentration and the results obtained can be seen from the following Table 2:

TABLE 2.—PLASMOPARA TEST

| Active Compound | Infestation in percent of infestation of untreated control at a concentration of active compound of 0.0031% |
|---|---|
| (C) 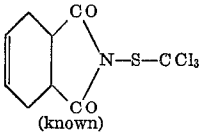 (known) | 5 |
| (I) 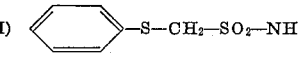 | 1 |

EXAMPLE 3

Fusicladium test (apple scab)/curative:
  Solvent—4.7 parts by weight acetone
  Emulsifier—0.3 part by weight alkylaryl polyglycol ether
  Water—95 parts by weight The amount of the particular active compound required for the desired final concentration of such active compound in a spray liquid is mixed with the stated amount of solvent and the resulting concentrate then diluted with the stated amount of water which contains the emulsifier.

Young apple seedlings with 4–6 foliage leaves are inoculated with an aqueous conidium suspension of *Fusicladium dendriticum* Fuck. which causes apple scab, and inculated for 18 hours in a moist chamber at 18–20° C. and at an atmospheric humidity of 100%. The plants are subsequently placed in a greenhouse to dry.

After standing for 24 hours, the plants are sprayed dripping wet with the subject spray liquid, prepared in the above manner, and again placed in the greenhouse.

Fifteen days after inoculation, the infestation of the apple seedlings is determined as a percentage of the untreated but also inoculated control plants.

0% indicates that no infestation occurred, whereas 100% indicates that the infestation is exactly the same as that of the control plants.

The active compounds, their concentrations, the period of time between inoculation and spraying and the results obtained can be seen from the following Table 3:

TABLE 3.—FUSICLADIUM TEST/CURATIVE

| Active Compound | Residence time, hours | Infestation in % of infestation of untreated control at a concentration of active compound of— | |
|---|---|---|---|
| | | 0.1% | 0.05% |
| (C) 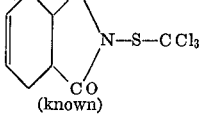 (known) | 42 | 57 | 49 |
| (I) 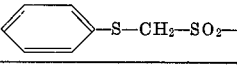 | 42 | 51 | 64 |

EXAMPLE 4

Phytophthora test/curative:
  Solvent—4.7 parts by weight acetone
  Emulsifier—0.3 part by weight alkylaryl polyglycol ether
  Water—95 parts by weight.

The amount of the particular active compound required for the desired final concentration of such active compound in a spray liquid is mixed with the stated amount of solvent and the resulting concentrate then diluted with the stated amount of water containing the emulsifier.

The terminal feathers of the feathery leaves of young tomato plants (Bonny best) with 2–6 foliage leaves are separated and placed into moist Petri dishes. In these dishes, the leaves are inoculated with an aqueous suspension of zoosporangia of *Phytophthora infestans*. The terminal feathers remain in the closed dishes for a definite period of time.

After this residence time, the inoculated leaves are dipped into the preparation of the subject active compound and the excess amount of liquid is wiped off. The leaves are returned to the Petri dishes and incubated in a climatic cabinet at 20° C. for 72 hours.

The infestation of the leaves is then determined as a percentage of the untreated but also inoculated control leaves. 0% indicates that no infestation occurred, whereas 100% indicates that the infestation is exactly the same as that of the control leaves.

The active compounds, their concentrations, the residence time and the results obtained can be seen from the following Table 4:

TABLE 4.—PHYTOPHTHORA TEST/CURATIVE

| Active Compound | Residence time, hours | Infestation in % of infestation of untreated control at a concentration of active compound of— | | | | |
|---|---|---|---|---|---|---|
| | | 0.2% | 0.1% | 0.05% | 0.025% | 0.0125% |
| (B) 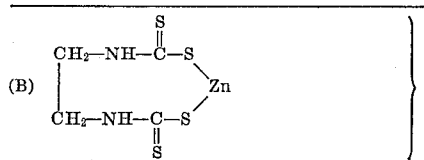 (known) | 6 | 100 | | | | |
| | 16 | 100 | | | | |
| (I) 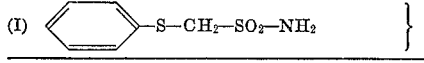 | 6 | | | 18 | | 32 |
| | 16 | | 65 | | 83 | |

EXAMPLE 5

Phytophthora test/systemic:
  Solvent—4.7 parts by weight acetone
  Emulsifier: 0.3 part by weight alkylaryl polyglycol ether
  Water—95 parts by weight The amount of the given active compound required for the desired final concentration of such active compound in a spray liquid is mixed with the stated amount of solvent and the resulting concentrate then diluted with the stated amount of water containing the emulsifier.

Young tomato plants (Bonny best) with 3–5 foliage leaves, which have been potted in standard soil, are drenched with the subject spray liquid three times at intervals of 24 hours so that only the soil at the bottom of the pot is completely soaked. 24 hours after the last treatment, the plants are inoculated with an aqueous suspension of zoosporangia of the fungus *Phytophthora infestans*. The plants are transferred into a moist chamber with an atmospheric humidity of 100% and a temperature of 18–20° C.

After 5 days, the infestation of the tomato plants is determined as a percentage of the untreated, but also inoculated control plants. 0% indicates that no infestation occurred, whereas 100% indicates that the infestation is exactly the same as that of the control plants.

The subject active compound, its concentrations, and the results obtained can be seen from the following Table 5:

taken from the treated lots was expressed as a percentage of the infestation of the leaves taken from the untreated control lot, i.e., the infestation of the control lot was set at 100.

The active compounds, their concentration and the results obtained can be seen from the following Table 6:

TABLE 6.—PHYTOPHTHORA TEST/FIELD TEST

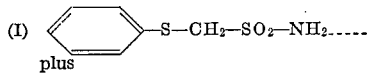

| Active Compound | Amount of active compound (kg./ha.) at a concentration in the spray liquor of 0.1% | Infestation in percent of infestation of untreated control |
|---|---|---|
| (A) Zinc propylene-bis-dithio-carbamate | 1.0 | 65.3 |
| (I) ⟨⟩—S—CH₂—SO₂—NH₂ plus | 0.5 + | 39.2 |
| (A) Zinc propylene-bis-dithio-carbamate | 0.5 | |

The following example is given for the purpose of illustrating, while not limiting, the production process in accordance with the present invention:

EXAMPLE 7

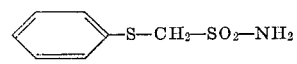
    (I)

220 grams (2 mol) of thiophenol (B.P. 66–68° C./13 mm. Hg) are placed in a flask of 4 liters capacity equipped with a stirrer. 1.5 liters of water (preferred temperature 60° C.) and 250 cc. of a 40% by volume sodium hydroxide solution are subsequently added and then 260 g. (2 mol) of chloromethane-sulfonamide (M.P. 72–75° C.) are introduced, with stirring. The reaction mixture is heated to boiling and kept at boiling for one hour. The reaction mixture is then allowed to cool, while stirring is continued, whereupon the crude product separates in crystalline form. The product is dried on unglazed plates or metal sheets under a hood at room temperature and recrystallized from benzene (+10% by volume alcohol)/petroleum ether. There are obtained 200 to 210 g. of a colorless, slightly flocculent product, i.e.

TABLE 5.—PHYTOPHTHORA TEST/SYSTEMIC

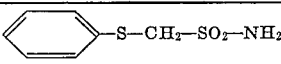

| Active Compound | Infestation in % of infestation of untreated control at a concentration of active compound of— | | | |
|---|---|---|---|---|
| | 0.025% | 0.0125% | 0.00625% | 0.003125% |
| (I) ⟨⟩—S—CH₂—SO₂—NH₂ | 0 | 0 | 28 | 51 |

EXAMPLE 6

Phytophthora test/field test: In open land, three test lots per active compound (3 repeats) with potatoes of the Grata variety were sprayed on four dates (7th July, 16th July, 4th August and 21st August) with spray liquids prepared from the given active compound.

The spray liquids were prepared from wettable powders with a content of 70% active compound by diluting with water. 1000 liters spray liquor per hectare were used in each case.

The natural infestation with *Phytophthora infestans* occurred only very late in the plant season, so that mainly the last spray treatment became effective.

Evaluation took place on the 26th of August following the last above date by counting in every test lot the infested and the healthy feathery leaves of 10 shoots with about 15–20 feathery leaves. The infestation of the leaves phenylmercaptomethane-sulfonamide; M.P. 101–103° C
Yield of pure product: 50 to 52% of theory.

What is claimed is:

1. Fungicidal composition consisting essentially of a mixture of a dispersible carrier vehicle selected from the group consisting of an inert liquid carrier and an inert solid carrier and a fungicidally effective amount, of between about 0.0001 and 95% by weight of the mixture, of phenyl-mercapto-methane-sulfonamide having the formula

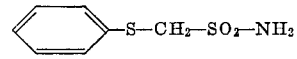

2. Composition according to claim 1 wherein said carrier vehicle is selected from the group consisting of (1) a dispersible carrier liquid containing a surface-active agent, and (2) a dispersible carrier solid.

3. Method of combating fungi which comprises applying to at least one of (a) such fungi and (b) their habitat, a fungicidally effective amount of phenyl-mercapto-methane-sulfonamide having the formula

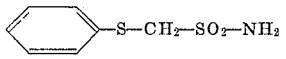

4. Method according to claim 3 wherein said sulfonamide is used in the form of a mixture with a dispersible carrier vehicle selected from the group consisting of an inert liquid carrier and an inert solid carrier with said sulfonamide being present in an amount of between about 0.0001 and 5% by weight of the mixture.

5. Method according to claim 3 wherein said sulfonamide is applied in an amount substantially between about 0.1 and 5 kg./ha. of cultivated soil.

References Cited

UNITED STATES PATENTS

| | | | |
|---|---|---|---|
| 3,086,974 | 4/1963 | Schlorz et al. | 260—556 XR |
| 3,140,314 | 7/1964 | Miller et al. | 424—321 XR |

ALBERT T. MEYERS, Primary Examiner

D. R. ORE, Assistant Examiner

U.S. Cl. X.R.

71—103